United States Patent [19]
Yoshikawa et al.

[11] Patent Number: 4,649,184
[45] Date of Patent: Mar. 10, 1987

[54] OXYGEN PERMEABLE SOFT CONTACT LENS MATERIAL

[75] Inventors: Toshiharu Yoshikawa; Takanori Shibata, both of Nagoya, Japan

[73] Assignee: Toyo Contact Lens Co., Ltd., Nagoya, Japan

[21] Appl. No.: 806,864

[22] Filed: Dec. 9, 1985

[30] Foreign Application Priority Data

Dec. 10, 1984 [JP]  Japan ............................ 59-261040

[51] Int. Cl.$^4$ ............................................. C08F 30/08
[52] U.S. Cl. ....................................... 526/279; 528/32; 351/160 H
[58] Field of Search ..................... 528/32; 526/279; 351/160 H

[56] References Cited

U.S. PATENT DOCUMENTS

| | | | |
|---|---|---|---|
| 4,260,725 | 4/1981 | Keogh et al. | 526/279 |
| 4,261,875 | 4/1981 | LeBoeuf | 260/29.7 |
| 4,419,505 | 12/1983 | Ratkowski et al. | 528/32 |
| 4,481,322 | 11/1984 | Godlewski et al. | 526/279 |
| 4,486,577 | 12/1984 | Mueller et al. | 525/474 |
| 4,575,546 | 3/1986 | Kemarczyk et al. | 528/32 |

FOREIGN PATENT DOCUMENTS 0030807  6/1981  European Pat. Off. .

Primary Examiner—Melvyn I. Marquis
Attorney, Agent, or Firm—Armstrong, Nikaido, Marmelstein & Kubovcik

[57] ABSTRACT

An oxygen permeable soft contact lens material having an improved oxygen permeability, improved softness and transparency prepared by copolymerizing a mixture comprising (a) a polyorganoxiloxane having polymerizable groups containing an unsaturated bond and hydrophilic groups containing a hydroxyl group in the molecular side chains, each of said side chains having a polymerizable group and a hydrogroup, and (b) a monomer having silylated hydroxyl groups as main components, and subjecting the resulting copolymer to desilylation.

5 Claims, No Drawings

OXYGEN PERMEABLE SOFT CONTACT LENS MATERIAL

BACKGROUND OF THE INVENTION

The present invention relates to a novel material for useful as an oxygen permeable soft contact lens, and more particularly to a soft contact lens material having a surface excellent in a hydrophilic property and moreover having a high oxygen permeability prepared by copolymerizing as main components, a polyorganosiloxane having a polymerizable group and a hydrophilic group in the molecular side chain and a hydroxyl group-containing hydrophilic monomer in which hydroxyl group is silylated prior to polymerization, and conducting the desilylation to produce hydroxyl group.

An excellent oxygen permeability is one of the most important conditions required for contact lens materials.

The following three methods hitherto have been proposed to improve the oxygen permeability.
(1) A process for improving an oxygen permeability wherein a behavior of water impregnated in a lens material is utilized by increasing the water content.
(2) A process for applying materials hitherto known as materials excellent in an oxygen permeability, for instance, a silicone rubber material, and the like, to contact lens materials.
(3) A process for using a silicone-containing monomer known as an oxygen permeable monomer, for instance, siloxanylalkyl (meth)acrylate monomers, and the like.

According to the above process (1), the oxygen permeability is improved by increasing the water content. On the contrary, the material has some problems such as a remarkable deterioration of mechanical strength when it is impregnated with water and an easiness to be contaminated when it is used as a contact lens.

A silicone rubber material which is most often used in the above process (2) has a water repellency unique to the material. When it is used as a contact lens which is contacted with a cornea, the lens surface shows no good affinity for the lacrimal fluid on the surface of cornea. Therefore, the lens surface is generally modified to have hydrophilic property by corona discharge treatment. However, the thus treated lens surface has some problems such as in the durability, and consequently, it causes trouble in the cornea when it is used for a long period of time.

Most of the materials used in the process (3) are hard materials, and they are useful to obtain so-called an oxygen permeable hard contact lens. However, the contact lens has some problems such as an uncomfortable feeling upon wearing caused by hard materials, characteristic of the hard contact lens made of polymethyl methacrylate which hitherto has been used.

It has been attempted to impart the hydrophilic property which is stable for a long period of time onto the surface of the contact lens by not modifying only the surface layer by means of physical surface treatment to decrease the surface repellency, but modifying the material itself in order to modify the silicone rubber material having excellent oxygen permeability and softness into a suitable contact lens material.

For instance, Japanese Unexamined Patent Publication No. 108881/1980 discloses that a hydrophilic siloxane having a side chain containing a polymerizable group and a side chain containing a hydroxyl group (a hydrophilic group) in a polyorganosiloxane chain is synthesized and then the hydrophilic siloxane is copolymerized with the hydrophilic siloxane independently or with other hydrophilic monomers to improve the hydrophilic property, and Japanese Unexamined Patent Publication No. 94323/1981 and No. 94324/1981 disclose that a polyorganosiloxane having a polymerizable group in the end of the molecular and a side chain having a hydrophilic group such as hydroxyl group is synthesized and then a contact lens made of polyorganosiloxane having an improved hydrophilic property is obtained by preparing a polymerization product containing the polyorganosiloxane as a main component. Also, Japanese Unexamined Patent Publication No. 102914/1984 discloses that a polyorganosiloxane having a polymerizable group in the chain of the polyorganosiloxane is synthesized through urethane, thiourethane, urea or an amide bond, and then a polymerization product having an improved hydrophilic property is synthesized by copolymerization of the polyorganosiloxane and various monomers.

In all prior arts mentioned above, a hydrophilic group is induced into a polyorganosiloxane which is used for a contact lens material, and the hydrophilic group is chemically bonded in the molecule, and therefore, the improvement of the hydrophilic property is recognized. However, in order to modify the water-repellency (hydrophobicity) that a polyorganosiloxane useful for a contact lens material used in contact with a cornea inherently possesses into the hydrophilic property, it is preferable to copolymerize with other hydrophilic monomers furthermore.

As disclosed in the above publications, it is difficult for a hydrophilic monomer to be uniformly admixed with a polyorganosiloxane by merely mixing them without any treatment. Also, when such a system is subjected to polymerization, the hydrophilic property is improved. However, when it is used for a contact lens, there is a defect such as an extreme lowering of the optical transparency, particularly in water (at wetting). The reason why the transparency is lowered has been considered to be as follows. Since generally the compatibility of the polyorganosiloxane having a high hydrophobic property and a hydrophilic monomer is not good and they are not copolymerized uniformly, a hydrophilic portion and a hydrophobic portion are formed in phase separation structure in a polymer molecular, and the refractive index of each separated phase is different from each other, and therefore the transparency is lowered.

The present invention is accomplished in order to obtain a polymer having a surface excellent in a hydrophilic property (wetting property) while maintaining a high oxygen permeability and a softness of a polyorganosiloxane useful as a contact lens material, and in order to solve such problems as the polyorganosiloxane having a polymerizable group and a hydrophilic monomer not being copolymerized uniformly, and therefore the obtained copolymer becomes non-uniform, or the optical transparency of the copolymer is lowered, particularly in water (at wetting).

A further object of the present invention is to provide a material having a suitable dynamic property (strength) and substantially a water-non-absorptive property or a lower water-absorptive property.

These and other objects of the present invention will become apparent from the description hereinafter.

SUMMARY OF THE INVENTION

In accordance with the present invention, there is provided an oxygen permeable soft contact lens material prepared by copolymerizing a mixture comprising (a) a polyorganosiloxane (A) having polymerizable groups and hydrophilic groups in the molecular side chains, each of which has a polymerizable group and a hydrophilic group, and (b) a monomer having silylated hydroxyl groups as main components, and subjecting the resulting copolymer to desilylation.

In the present invention, there can be obtained a contact lens material having a high oxygen permeability, an excellent softness, an excellent dynamic property, an excellent optical property and particularly an excellent transparency in water (at wetting), and substantially having an improved water non-absorptive property or lower water-absorptive property by silylating a hydroxyl group of a hydrophilic monomer having a hydroxyl group to improve the compatibility with the polyorganosiloxane (A), copolymerizing homogeneously the polyorganosiloxane (A) and a monomer having a silylated hydroxyl group, and then desilylating the obtained copolymer.

DETAILED DESCRIPTION

In accordance with the present invention, the polyorganosiloxane (A) having polymerizable groups and hydrophilic groups in the molecular side chains, each of which has a polymerizable group and a hydrophilic group, is used as a main constitutive component of a contact lens material.

The representative examples of the polyorganosiloxane (A) are those represented by the general formula (I):

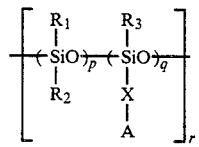

wherein $R_1$, $R_2$ and $R_3$ are the same or different, and each is an alkyl group having 1 to 4 carbon atoms, trimethylsiloxy group or phenyl group; X is a group having a hydrophilic group; A is a polymerizable group; p and q are integer to show a contaminating ratio of a polymerizable group satisfied the formula:

$$0.001 \leq \frac{q}{p+q} \leq 0.1,$$

and r is a figure which represents the degree of polymerization and is an integer of not less than 1.

The polyorganosiloxane (A) is prepared, for instance, by reacting a polyorganosiloxane having at least one epoxy group in a molecular side chain (hereinafter referred to as "polyorganosiloxane (B)") and a compound having a polymerizable group (a compound having an unsaturated group). The thus obtained polyorganosiloxane (A) has at least one polymerizable group in the side chains of the molecule through the portion X which has a hydrophilic group derived from an epoxy group, or the like and the hydrophilic property of the polyorganosiloxane (A) improves in proportion with the number of polymerizable groups. Moreover the hydrophilic group such as a hydroxyl group formed by the above reaction enables the improvement of the water repellency which is a defect of a conventional silicone rubber material and the compatibility with other hydrophilic monomers. Further, since it has a hydrophilic group in the molecule, a soft contact lens material of the present invention prepared by polyorganosiloxane (A) as a final product has a stable hydrophilic property for a long period of time without a hydrophilic treatment by a physical surface treatment such as discharge treatment.

The polyorganosiloxane (A) can be copolymerized with other various monomers, because it has at least one polymerizable group in the molecular side chain and when it has at least two polymerizable groups in the molecular side chain, it has an ability to crosslink the copolymer itself (crosslinking ability) and it enables the improvement of the strength of the copolymer itself and the stability of the shape (durability, heat resistance, solvent resistance, and the like).

The representative examples of the polyorganosiloxane (B) are, for instance, polyorganosiloxanes having at least one epoxy group in its molecular side chain represented by the general formula (II):

wherein $R_1$, $R_2$, $R_3$, p, q and r are as defined above, and Y is a side chain having an epoxy group.

The representative examples of the compound having a polymerizable group to react with the polyorganosiloxane (B) for use in preparing a polyorganosiloxane (A) are, for instance, an unsaturated carboxylic acid represented by the general formula (III):

$$R_a\text{—COOH} \tag{III}$$

wherein $R_a$ is a polymerizable unsaturated group, such as acrylic acid, methacrylic acid, vinylbenzoic acid, allylbenzoic acid, methacryloyloxybenzoic acid or vinylbenzyl carboxylic acid; and a phenolic unsaturated compound having hydroxyl group represented by the general formula (IV):

$$\text{Ar—OH} \tag{IV}$$

wherein Ar is a polymerizable unsaturated group having an aromatic ring, such as vinylphenol, methacryloyl oxyphenol, acryloyl oxyphenol, methacryloyl oxymethylphenol or hydroxymethacryloyl oxynaphthalene. However, the compound having a polymerizable group for use in the present invention is not limited to the exemplified ones, and compounds having a polymerizable group which reacts with a reactive group, e.g. epoxy group, present in the side chain of the polyorganosiloxane (B) to produce a hydrophilic group and a polymerizable group in the molecular side chain.

The polyorganosiloxane (A) which is used in the present invention is synthesized by reacting the polyorganosiloxane (B) and the above-mentioned compounds having a polymerizable group in the presence or absence of a solvent and in the presence of a slight amount of a polymerization inhibitor, e.g. 4-p-t-butyl pyrocatechol or hydroquinone monomethyl ether, at a temperature of about 80° to about 150° C., so as to conduct a ring opening reaction of the epoxy group. Thus the number of polymerizable groups corresponding to the number of epoxy groups is introduced into the polyorganosiloxane (A).

The polyorganosiloxane (B) having at least one epoxy group in the molecular side chain is easily synthesized by preparing a polyorganosiloxane (C) having a

group which is synthesized by ring-opening reaction of a cyclic organosiloxane mixture (which has at least one

group), and then by reacting the polyorganosiloxane (C) having a

group and an epoxy compound having an olefinically unsaturated group. Therefore the amount of the above-mentioned epoxy group can be controlled by adjusting the amounts of the ingredients to be charged in the stage of the synthesis.

The structure of X in the general formula (I) is decided by the kind of epoxy compound having an olefinically unsaturated group. Typical examples of the epoxy compounds are those represented by the general formula (V):

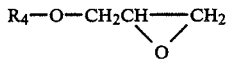

wherein $R_4$ is an allyl group, $CH_2=CHCH_2(OC_2H_4)_{\overline{n}}$ wherein n is an integer of 2 to 50, $CH_2=CHCH_2(OC_3H_6)_{\overline{m}}$ wherein m is an integer of 2 to 50 or $CH_2=CHCH_2OC_lH_{2l}-$ wherein l is an integer of 1 to 50, such as allyl glycidyl ether, allyl poly(oxyethylene)glycidyl ether, allyl poly(propylene)glycidyl ether, or compounds of the general formula (VI):

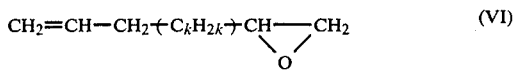

wherein k is O or an integer of 1 to 50, such as 4,5-epoxy-1-pentene, 5,6-epoxy-1-hexene, 6,7-epoxy-1-heptene, 7,8-epoxy-1-octene, 8,9-epoxy-1-nonene, 9,10-epoxy-1-decene. However, the epoxy compounds are not limited to the exemplified ones.

For instance, when polyorganosiloxane (B) is prepared by reacting polyorganosiloxane (C) and allyl glycidyl ether which is one of the compounds represented by the general formula (V), Y in the general formula (II) is

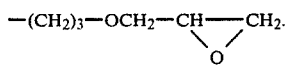

The polyorganosiloxane (A) is an ingredient important in maintaining high oxygen permeability, softness and substantial water non-absorptive property or lower water-absorptive property which are main physical properties of the present invention material, and the ratio of the polyorganosiloxane (A) occupied in the copolymer before desilylation is preferably at least about 50% by weight, more preferably 60 to 90% by weight.

According to the present invention, a copolymer is prepared by copolymerizing the polyorganosiloxane (A) and a monomer having silylated hydroxyl group (hereinafter referred to as "silylated monomer") as main components.

The ratio of polyorganisiloxane (A)/silylated monomer is preferably from 95/5 to 50/50 by weight, more preferably from 90/10 to 70/30 by weight. When the ratio of polyorganosiloxane (A)/silylated monomer is more than 95/5 by weight, the effect produced by hydrophilic units derived from a silylated monomer is not sufficient. When the ratio is less than 50/50 by weight, the contact lens material possesses a water-absorptive property, and the contact lens material has a tendency to have a difficulty in maintaining substantially the water non-absorptive property or lower water-absorptive property (water content: less than about 15% by weight) which is one of the objects of the present invention and moreover the excellent oxygen permeability derived from the polyorganosiloxane is not sufficiently exhibited.

The hydrophilic monomer having hydroxyl group is particularly used in order to improve the surface hydrophilic property (wetting property) and the transparency in water (at wetting) maintaining the oxygen permeability of the polyorganosiloxane (A) without lowering it as much as possible.

The improvement of strength (the improvement of durability derived from the improvement of tensile strength) which is unexpected is revealed in a contact lens obtained from the lens material of the present invention by copolymerizing the hydrophilic monomer having a hydroxyl group and the polyorganosiloxane (A).

It is possible to copolymerize the hydrophilic monomer having hydroxyl group and the polyorganosiloxane (A) without any modification. However, in general, the compatibility of the hydrophilic monomer having hydroxyl group and the polyorganosiloxane (A) is not good, and the hydrophilic monomer having hydroxyl group and the polyorganosiloxane (A) are easy to separate from each other as is micelle, and therefore, it is difficult to obtain a suitable copolymer for use in a homogeneous contact lens material.

Thereupon, in the present invention, the hydroxyl group in the hydrophilic monomer is silylated, and then copolymerized with the polyorganosiloxane (A) in order to improve their compatibilities. Thus a homogeneous copolymer is obtained.

The silylation of the hydroxyl group of the hydrophilic monomer having a hydroxyl group, that is

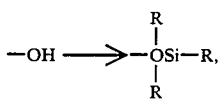

wherein R is an alkyl group, can be carried out by reacting a hydrophilic monomer having a hydroxyl group and a trialkylsilyl halogenide, e.g. trimethylchlorosilane, in a solvent having no hydroxyl group such as acetone, toluene or xylene.

When using a dialkylsilyl dihalogenide, for instance, dimethyldichlorosilane, or the like instead of trimethylchlorosilane, two hydroxyl groups can be silylated at the same time.

For instance, hydroxyethyl methacrylate can be silylated to such a form as in the following formula:

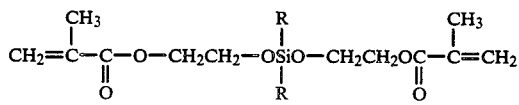

wherein R is as defined above.

Particularly, when the silylated hydroxyethyl methacrylate is copolymerized with the polyorganosiloxane (A), the silylated hydroxyethyl methacrylate which is silylated as in the above form has the same behavior as an usual cross-linkable monomer. Therefore, it improves the mechanical processability of the copolymer prepared before the step of treating a desilylation and it is preferably used.

Moreover, when the cross-linking is cleaved after desilylating, it imparts a hydrophilic property (wetting property) onto the surface of the obtained contact lens.

Representative examples of the hydrophilic monomer having a hydroxyl group which are used for preparing a silylated monomer used in the present invention are, for instance, a hydroxyalkyl (meth)acrylate such as hydroxyethyl (meth)acrylate or hydroxypropyl (meth)acrylate, hydroxybutyl (meth)acrylate; a dihydroxyalkyl (meth)acrylate such as 2,3-dihydroxy-2-methylpropyl (meth)acrylate or 2,3-dihydroxypropyl (meth)acrylate; a hydroxyaryl (meth)acrylate such as 2-dihydroxy-3-(meth)acryloyl oxynaphthalene; a hydroxy(-poly)alkylene glycol mono(meth)acrylate such as diethylene glycol mono(meth)acrylate, triethylene glycol mono(meth)acrylate or propylene glycol mono(meth)acrylate; (poly)glycerol mono(meth)acrylate such as glycerol mono(meth)acrylate; an alkoxy(poly)glycerol mono(meth)acrylate such as 2-ethylhexoxy glycerol mono(meth)acrylate; an aryloxy (poly)glycerol mono(-meth)acrylate such as phenoxyglycerol mono(meth)acrylate; a (meth)acrylate having a hydroxyl group represented by the constitutional formula:

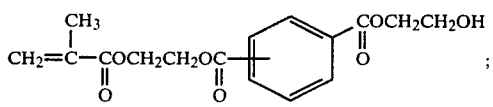

an unsaturated carboxylic acid such as (meth)acrylic acid. The term "a mixture comprising a polyorganosiloxane (A) and a silylated monomer as main components" as herein used means that a polyorganosiloxane is contained in an amount of at least 50% by weight, preferably 60 to 90% by weight in the copolymer which has not been subjected to the desilylation, and that the units derived from the silylated monomer are contained in an amount of at least 5% by weight, preferably 10 to 30% by weight in the copolymer.

The components except for the polyorganosiloxane (A) and the silylated monomer are, for instance, a hydrophobic monomer having an aromatic monomer such as an alkylstyrene such as styrene, α-methylstyrene, t-butylstyrene or isopropylstyrene; benzyl methacrylate; alkyl (meth)acrylate such as methyl (meth)acrylate, ethyl (meth)acrylate, propyl (meth)acrylate, butyl (meth)acrylate, hexyl (meth)acrylate, 2-ethylhexyl (meth)acrylate, trifluoroethyl (meth)acrylate or dodecyl (meth)acrylate; an alkoxy(poly)alkylene glycol (meth)acrylate such as methoxydiethylene glycol (meth)acrylate or ethoxytripropylene glycol (meth)acrylate; an alkyl itaconate such as dimethyl itaconate or diethyl itaconate; an alkyl crotonate such as propyl crotonate; N,N-dimethyl(meth)acrylamide, N-vinylpyrrolidone. However, the components are not limited to the exemplified ones.

The hydrophobic monomers having aromatic rings which are contained in the above exemplified ones can be improved in the strength, particularly the elastic modulus of the obtained contact lens by copolymerizing with the polyorganosiloxane (A), and especially remarkably improved in the strength by the synergism of using it with the silylated monomer.

It is preferable that the content of the hydrophobic monomer having the aromatic ring in the copolymer is 0 to about 25% by weight, and in order to improve the strength furthermore, it is desired that the amount is at least about 5% by weight.

The preferable ratio of the silylated monomer to the hydrophobic monomer having the aromatic ring is about from 1/1 to 3/1 by weight from the viewpoint of keeping the hydrophilic property and the transparency in water and further improving the strength. When these two kinds of monomers are used at the same time, the strength of the obtained copolymer can be improved about 3 to 5 times that of the homopolymer of the polyorganosiloxane (A).

The above-mentioned monomers used with the silylated monomer, except for hydrophobic monomers having aromatic rings, are suitably used for adjusting the properties of the contact lenses such as hardness, stability of the shape. Such monomers are used in amounts such that the content in the obtained copolymer is at most 20% by weight, preferably at most 10% by weight. When the amount of the monomers is too much, the oxygen permeability and the softness of the polyorganosiloxane (A) tend to be lowered.

The material of the present invention is prepared by desilylating the copolymer containing the polyorganosiloxane (A) and the silylated monomer as main components. The desilylation is usually carried out by hydrolyzing with alcohol (alcoholysis). This treatment eliminates silyl groups which are introduced to attain uniform polymerization of the hydrophilic monomer having a hydroxyl group and the polyorganosiloxane (A), thus yields a hydroxyl group and, therefore, the surface hydrophilic property (wetting property) and strength can be imparted to the contact lens. Alcohols used in the desilylating reaction include usual alcohols such as methanol, ethanol or propanol, and water containing alcohols can be also employed. The term "water-absorptive alcohols" means the alcohols containing water about 1 to 40% by weight and they can promote the desilylating reaction effectively by heating.

In the case of desilylating a copolymer having one hydroxyl group which is silylated the reaction is represented as follows.

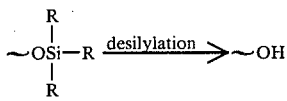

wherein R is as defined above.

In the case of desilylating a copolymer having two hydroxyl groups which is silylated at the same time, the reaction is represented as follows.

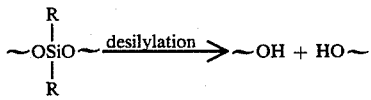

wherein R is as defined above.

When preparing the material of the present invention, free radical polymerization initiators which are usually used in the polymerization of unsaturated hydrocarbons can be used. The polymerization initiators are exemplified such as benzoylperoxide, azobisisobutyronitrile, azobisdimethylvaleronitrile. The above polymerization initiators may be employed alone or in admixture thereof. The preferable amount of the polymerization initiator is about 0.01 to about 2% by weight based on the amount of the reactant.

A molding process (casting process) is suitable for the preparation of a soft contact lens from the material of the present invention because the material is soft and elastic. As a mold used in the cast polymerization, there is used, for instance, a mold having concave and convex inner surfaces being suitable for the desired contact lens shape prepared from a metal such as brass or a plastic material which is bearable for conditions at using, by cutting and grinding, or an injection method.

The polymerization is carried out by pouring a monomer mixture and a slight amount of a polymerization initiator into the above concave mold by a usual technique, and then putting a convex mold over the concave mold and interposing with a clamp at about 50° to 200° C. for 5 to several hours. After completion of the polymerization and cooling, a copolymer being formed in a shape of contact lens is obtained by removing the concave mold and convex mold in a solvent which has no affinity for the contact lens. A soft contact lens made of the material of the present invention can be prepared by desilylating the obtained copolymer with heating in an aqueous solution of a usual alcohol and then by immersing in an aqueous solution such as physiological saline solution.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof.

REFERENCE EXAMPLE 1

A three-necked flask was charged with 60 g of polyorganosiloxane having a molecular weight of about 70,000 and having a glycidyl group in the side chain of the molecule (glycidyl group content: 0.4%, made by Shin-Etsu Chemical Co., Ltd.), 120 g of methacrylic acid and 0.3 g of hydroquinone monomethyl ether as a polymerization inhibitor and the reaction was carried out at a temperature of 123° to 131° C. for 90 minutes.

Then, 4.5 l of n-hexane was added to the reaction mixture and it was washed with 5 l of 1% aqueous sodium hydroxide solution, then with 5 l of water. The mixture was dried with anhydrous magnesium sulfate, magnesium sulfate was filtered off and n-hexane was removed under reduced pressure to give 57.2 g of a product.

The obtained product was a viscous light yellow transparent liquid (hereinafter referred to as "Si 1").

EXAMPLE 1

A polyester resin was subjected to a mechanical process such as cutting or polishing to give a concave and a convex mold which have predetermined lens contour.

There were mixed Si 1, trimethylsilylated 2-hydroxyethyl methacrylate, benzyl methacrylate and azobisdimethyl valeronitrile as a polymerization initiator in a proportion shown in Table 1 and the mixture was injected into the above-mentioned concave mold gently. The convex mold was put on it, and the concave and convex molds were clipped by a clamp so that air bubbles were not contained, and fixed. After the mold was heated at 50° C. for 8.5 hours in a hot-air circulation type dryer and the heat-polymerization was stepwise carried out at 60° C. for 90 minutes, at 70° C. for 90 minutes, at 80° C. for 90 minutes and at 90° C. for 90 minutes, it was cooled at room temperature. The clamp was removed and the concave and the convex molds were separated by soaking in ethanol to take out the molded contact lens. The obtained contact lens was dipped in 90% aqueous ethanol solution and desilylated by boiling in 90% aqueous ethanol solution for 7 hours. Then unreacted monomers, and the like were washed away by using a Soxhlet's extractor in ethanol as a medium for 7 hours and it was dipped in 0.9% aqueous physiological saline solution to give a soft contact lens.

The obtained soft contact lens was colorless and transparent, and had excellent shape stability, restoring force to bending and water-wettability of the surface of lens (surface hydrophilic property).

With respect to the film of the copolymer prepared in the same manner as in Example 1 having a thickness of 0.2 mm, water content, oxygen permeability needle penetration strength, elongation, surface water-wettability, transparency of dipped film in water and contact angle were measured by the following methods. The results are shown in Table 1.

[Water content (%)]

The water content is calculated on the basis of the following formula:

$$\text{Water content (\%)} = \frac{\text{(Weight of equilibrium wet film (g))} - \text{(Weight of dry film (g))}}{\text{Weight of equilibrium wet film (g)}} \times 100$$

[Oxygen permeability ($\times 10^{-10}$ ml $O_2 \cdot$cm/(cm$^2 \cdot$sec$\cdot$mmHg))]

The oxygen permeability is measured at 35° C. by a film oxygen-gas permeater of the Seikaken type (made by Rikenseiki Kogyo Kabushiki Kaisha)

[Needle penetration strength (g)]

A round head of a pressure needle having a diameter of 1/16 inch is put on the center of the film dipped in water and the weight value (g) is measured at the time when the specimen is penetrated by employing an Instron compression tester.

[Elongation (%)]

Elongation of the film is measured at the time when needle penetration strength is measured. The value shows the elongation at breaking.

[Surface wettability]

Surface wettability is observed with the naked eye at the time when the film is taken out from water.

[Transparency in dipped film with water]

Transparency of the film is observed with the naked eye in dipped film in water.

[Contact angle]

Contact angle of the film to water is measured by the foaming method.

EXAMPLES 2 TO 18

The procedure of Example 1 was repeated except that the kinds and amounts of components in the polymerization were changed as shown in Table 1 to give a film having a thickness of 0.2 mm.

With respect to the obtained film, water content, oxygen permeability, needle penetration strength, elongation, surface water-wettability, transparency in dipped state in water and contact angle were measured in the same manner as in Example 1.

The result are shown in Table 1.

TABLE 1

| Ex. No. | 1 | 2 | 3 | 4 | 5 | 6 | 7 | 8 | 9 |
|---|---|---|---|---|---|---|---|---|---|
| Components (part) | | | | | | | | | |
| SiI | 73 | 73 | 73 | 73 | 73 | 73 | 70 | 70 | 80 |
| Trimethylsilylated 2-hydroxyethyl methacrylate | 18 | 18 | — | — | — | — | 30 | — | — |
| Trimethylsilylated hydroxypropyl methacrylate | — | — | 18 | 18 | — | — | — | 30 | 20 |
| Trimethylsilylated 2-ethylhexylglycerol methacrylate | — | — | — | — | — | — | — | — | — |
| Trimethylsilylated 2,3-dihyroxy-2-methylpropyl methacrylate | — | — | — | — | 18 | 18 | — | — | — |
| Trimethylsilylated phenoxyglycerol methacrylate | — | — | — | — | — | — | — | — | — |
| Styrene | — | 9 | 9 | — | — | 9 | — | — | — |
| Benzyl methacrylate | 9 | — | — | 9 | 9 | — | — | — | — |
| Azobisdimethyl valeronitrile | 0.4 | 0.4 | 0.4 | 0.4 | 0.4 | 0.4 | 0.3 | 0.4 | 0.4 |
| Physical properties | | | | | | | | | |
| Water content (% by weight) | 0.2 | 0.1 | 1.3 | 1.0 | 3.1 | 4.3 | — | 2.2 | 0 |
| Oxygen permeability ($\times 10^{-10}$ ml $O_2 \cdot$cm/cm$^2 \cdot$sec$\cdot$mm Hg) | 12.1 | 10.2 | 8.6 | 9.8 | 9.8 | 9.0 | 11.7 | 10.0 | 9.1 |
| Needle Penetration strength (g) | 482 | 545 | 358 | 471 | 443 | 275 | 196 | 402 | 179 |
| Elongation (%) | 70 | 76 | 49 | 54 | 44 | 70 | 49 | 76 | 44 |
| Surface wettability | Excellent | Excellent | Excellent | Excellent | Excellent | Excellent | Excellent | Excellent | Excellent |
| Transparency in dipped state with water | Colorless & transparent | Colorless & transparent | Colorless & transparent | Colorless & transparent | Colorless & transparent | Colorless & transparent | Colorless & transparent | Colorless & transparent | Colorless & transparent |
| Contact angle (°) | 33 | 24 | 30 | 36 | 31 | 31 | 35 | 33 | 40 |

| Ex. No. | 10 | 11 | 12 | 13 | 14 | 15 | 16 | 17 | 18 |
|---|---|---|---|---|---|---|---|---|---|
| Components (part) | | | | | | | | | |
| SiI | 90 | 70 | 80 | 90 | 70 | 80 | 90 | 80 | 90 |
| Trimethylsilylated 2-hydroxyethyl methacrylate | — | — | — | — | — | — | — | — | — |
| Trimethylsilylated hydroxypropyl methacrylate | 10 | — | — | — | — | — | — | — | — |

TABLE 1-continued

| | | | | | | | | | |
|---|---|---|---|---|---|---|---|---|---|
| Trimethylsilylated 2-ethylhexylglycerol methacrylate | — | 30 | 20 | 10 | — | — | — | — | — |
| Trimethylsilylated 2,3-dihydroxy-2-methylpropyl methacrylate | — | — | — | — | 30 | 20 | 10 | — | — |
| Trimethylsilylated phenoxyglycerol methacrylate | — | — | — | — | — | — | — | 20 | 10 |
| Styrene | — | — | — | — | — | — | — | — | — |
| Benzyl methacrylate | — | — | — | — | — | — | — | — | — |
| Azobisdimethyl valeronitrile | 0.4 | 0.4 | 0.4 | 0.4 | 0.4 | 0.4 | 0.4 | 0.4 | 0.4 |
| Physical properties | | | | | | | | | |
| Water content (% by weight) | 0.3 | — | — | — | 11.7 | 4.4 | 1.5 | 0.2 | 0.2 |
| Oxygen permeability ($\times 10^{-10}$ ml $O_2 \cdot$ cm/cm$^2 \cdot$ sec $\cdot$ mm Hg) | 9.8 | 10.5 | 10.2 | 11.6 | 14.1 | 13.6 | 9.1 | 7.5 | 8.9 |
| Needle Penetration strength (g) | 124 | 116 | 100 | 152 | 174 | 261 | 129 | 210 | 145 |
| Elongation (%) | 54 | 76 | 49 | 70 | 49 | 76 | 54 | 49 | 54 |
| Surface wettability | Excellent | Excellent | Excellent | Excellent | Excellent | Excellent | Excellent | Excellent | Excellent |
| Transparency in dipped state with water | Colorless & transparent | Colorless & transparent | Colorless & transparent | Colorless & transparent | Colorless & transparent | Colorless & transparent | Colorless & transparent | Colorless & transparent | Colorless & transparent |
| Contact angle (°) | 41 | 33 | — | — | — | 36 | — | 40 | 23 |

An oxygen permeable hard contact lens (commercially available under the commercial name "Menicon $O_2$" made by Toyo Contact lens Co., Ltd.), which was composed of siloxanyl acrylate or siloxanyl methaacrylate as a main component had an oxygen permeability of $1.05 \times 10^{-10}$ ml $O_2$·cm/(cm$^2$·sec·mmHg) (a thickness: 0.2 mm) and a commercially available high water content lens having a water content of 78%, which was composed of N-vinyl pyrrolidone and methyl methacrylate as main components had an oxygen permeability of $6.4 \times 10^{-10}$ ml $O_2$·cm/(cm$^2$·sec·mmHg) (a thickness: 0.2 mm) [$4.2 \times 10^{-10}$ ml $O_2$·cm/(cm$^2$·sec·mmHg) (a thickness: 0.12 mm) measured by the applicants]. In contrast, the contact lens material of the invention had an oxygen permeability of $7.5 \times 10^{-10}$ to $13.6 \times 10^{-10}$ ml $O_2$·cm/(cm$^2$·sec·mmHg) (a thickness: 0.2 mm).

Also, a silicone rubber had a contact angle of about more than 100° and polymethyl methacrylate had a contact angle of about 60°. As against, the contact lens material of the invention had a contact angle of 23° to 41°.

Further, the above-mentioned commercially available high water absorptive lens had a needle penetration strength of 125 g (a thickness: 0.2 mm). As against, the contact lens material of the invention had a needle penetration strength of 100 to 545 g (a thickness: 0.2 mm). Particularly, when the contact lens prepared from the polyorganosiloxane (A), the silylated monomer and the hydrophobic monomer having aromatic rings (Examples 1 to 6), the needle penetration strength of the contact lens was from 275 to 545 g.

As mentioned above, it is confirmed that the material of the invention is extremely excellent for the use of contact lenses.

The contact lens material which is easy to fit with the cornea and optically transparent, can solve the disadvantages such that the remarkable lowering of the strength at wetting, easiness to be contaminated, and it shows high oxygen permeability and excellent shape stability.

In addition to the ingredients used in the Examples, other ingredients can be used in the examples as set forth in the specification to obtain substantially the same results.

What we claim is:

1. An oxygen permeable soft contact lens material prepared by copolymerizing a mixture comprising (a) a polyorganosiloxane (A) having in its molecular side chains polymerizable groups containing an unsaturated bond and hydrophilic groups containing a hydroxyl group, each of said chains having one said polymerizable group and one said hydrophilic group, and (b) a monomer having a silylated hydroxyl groups as main components, and subjecting the resulting copolymer to desilylation.

2. The contact lens material of claim 1, wherein each of said polymerizable groups in the molecular side chains of said polyorganosiloxane (A) is present through a hydrophilic group-containing portion formed by reaction of a polyorganosiloxane (B) having epoxy groups in its molecular side chains and a compound having a polymerizable unsaturated group.

3. The contact lens material of claim 1, wherein the ratio of said polyorganosiloxane (A) to said silylated monomer having hydroxyl group is from 95/5 to 50/50 by weight.

4. The contact lens material of claim 1, wherein the ratio of said polyorganosiloxane (A) to said silylated monomer having hydroxyl group is from 90/10 to 70/30 by weight.

5. The contact lens material of claim 1, wherein a hydrophobic monomer having an aromatic ring is contained at most 25% by weight in said copolymer of the polyorganosiloxane (A) and the silylated monomer having hydroxyl group, and the ratio of said monomer having silylated hydroxyl group to said hydrophobic monomer having an aromatic ring is from 1/1 to 3/1 by weight.

* * * * *